/ [11] 3,617,931

| [72] | Inventors | Douglas A. Pinnow<br>Berkeley Heights;<br>LeGrand G. Van Uitert, Morris Township,<br>Morris County, both of N.J. |
|---|---|---|
| [21] | Appl. No. | 821,894 |
| [22] | Filed | May 5, 1969 |
| [45] | Patented | Nov. 2, 1971 |
| [73] | Assignee | Bell Telephone Laboratories, Incorporated<br>Murray Hill, N.J. |

[54] ACOUSTO-OPTIC DEVICES USING LEAD MOLYBDATE AND RELATED COMPOUNDS
11 Claims, 6 Drawing Figs.

[52] U.S. Cl............................................ 331/94.5,
178/7.6, 350/161, 350/162
[51] Int. Cl..................................................... G02f 1/32
[50] Field of Search........................................ 331/94.5;
350/161, 162; 178/7.6

[56] References Cited
OTHER REFERENCES

Pinnow: " Guide Lines for the Selection of Acoustooptic Materials," IEEE Journal of Quantum Electronics, vol. QE-6, pp. 223– 238, April, 1970.

*Primary Examiner*—Ronald L. Wibert
*Assistant Examiner*—Edward S. Bauer
*Attorneys*—R. J. Guenther and Edward B. Cave ABSTRACT: Acousto-optic devices dependent for their operation on lead molybdate ($PbMoO_4$) and related compounds show efficiencies comparable to that of devices made from alpha-iodic acid and superior to that of devices constructed of earlier materials such as lithium niobate. Optical deflectors useful in modulators, switches and correlators are described.

PATENTED NOV 2 1971

INVENTORS: D. A. PINNOW
L. G. VAN UITERT

BY George S. Indig
ATTORNEY

ACOUSTO-OPTIC DEVICES USING LEAD MOLYBDATE AND RELATED COMPOUNDS

BACKGROUND OF THE INVENTION

1. Field of the Invention

The invention is concerned with devices involving deflection of electromagnetic radiation at visible and infrared frequencies responsive to an applied signal. While any of a variety of mechanisms may produce such deflection, the claimed devices are dependent upon an acousto-optic interaction. Such devices may be used as modulators, deflectors, correlators, switches, etc.

2. Description of the Prior Art

For some time it has been recognized that continuing development in various fields concerned with electromagnetic radiation will eventually result in a broad range of commercial devices operating at visible and near visible wavelengths. Relevant fields include communications and optical display systems. Devices may operate as modulators, optical deflectors and correlators. While development effort has been stimulated by the development of the laser oscillator, certain of the devices may utilize incoherent and/or unpolarized radiation. Most require radiation which is substantially monochromatic although even here some may operate with relatively broad and/or varying bandwidth.

Relevant devices for altering some property of transmitted radiation depend upon a time variation or a space variation of refractive index responsive to an applied signal which may ultimately be produced by electrical excitation. The effect of the variation in refractive index is to produce a change in phase, frequency, amplitude, position or direction of a beam. Refractive index changes may be brought about through a variety of interactions, e.g. electro-optic, magneto-optic, and acousto-optic. While electro-optic and magneto-optic interactions now appear promising for certain communication uses, the acousto-optic interaction is considered superior for many purposes. The range of application of acousto-optic devices has been expanding steadily and is currently under intense study, see Vol. 54 *Proceedings of the IEEE*, p. 1391, Oct. 1966.

Acousto-optic devices are, in essence, elastic wave-induced three-dimensional diffraction gratings, producing an angular diffraction of a portion of an incoming electromagnetic wave. The angle of diffraction and the portion diffracted generally increase with the frequency and amplitude, respectively, of the interacting elastic wave. This mechanism naturally suggests position-sensitive devices such as beam deflectors used, for example, in information retrieval systems. Other uses may take advantage of ancillary effects as, for example, the variation in amplitude of the through-transmitted or diffracted beams due to variation in some property of the elastic wave. Depending on configuration dimensions, frequencies of the two types of wave energy, etc., such devices may be considered to operate over the range which has limits of Bragg or Raman-Nath diffraction as discussed later.

Recognizing the design advantages of acousto-optic devices for certain uses, there has been considerable experimentation using a large number of materials, and relevant characteristics have been reported, see, for example, *Journal of Applied Physics*, Vol. 38, p. 5149 (1967). For many purposes, the most promising acousto-optic material reported in the above paper was lithium niobate. Power levels and bandwidth obtained with this material make it clear that more efficient materials are required.

A recently developed material, alpha-iodic acid ($HIO_3$), has a substantially higher acousto-optic figure of merit than any of the earlier reported materials. This material is water soluble and can be grown from aqueous solution with high optical quality. However, due to the solubility, special fabrication procedures and protection from environmental constituents are required.

SUMMARY OF THE INVENTION

A class of substantially water-insoluble materials including $PbMoO_4$, $TlReO_4$ and $PbWO_4$ is found to have significantly higher acousto-optic figures of merit than earlier investigated water-insoluble materials. While figures of merit are in some cases somewhat inferior to that of alpha-iodic acid, these materials are of importance because of practical advantages such as ease of fabrication, because there is no need to protect devices from atmospheric constituents, etc. Certain of the members of this class show specific advantages as compared with $\alpha HIO_3$, e.g. deflection angle may be insensitive to polarization sense.

For convenience, description of the invention is largely in terms of $PbMoO_4$. The invention, however, contemplates the use of a class of compounds as well as mixtures of two or more members of the class. A detailed description of the contemplated compounds is set forth under *Material Considerations*. All compounds are oxidic and all include lead or thallium as cation. It is this class of materials which is contemplated where use is made of the terminology "...and related materials."

Consistent with usual interpretation, "acousto-optic" has reverence to interactions between elastic waves and electromagnetic waves generally, regardless of frequency. There is, however, a definite material limitation imposed on the wavelength of the "optic" or electromagnetic energy by reason of transparency bandwidth which generally encompasses and extends beyond the visible spectrum. For example, the transparency bandwidth of $PbMoO_4$ includes the wavelength range of from 0.39 to 5.6 microns. The term "optic," therefore, is intended to encompass wavelengths in the near ultraviolet, and infrared as well as the visible spectra within the appropriate wavelength range. The term "acoustic" is intended to encompass any elastic wave. The term is not to be limited to wavelengths within the human audible range but is intended to include ranges variously referred to as sonic, supersonic, and ultrasonic, etc. In fact, the elastic wavelength range is determined by the desired range of operation of the particular device under consideration. This range is limited only by the general requirement that the elastic wavelength be equal to or greater than one half of the optical wavelength in the acousto-optic medium. This general requirement arises from a consideration of the minimum line spacing in the "-grating" (equal to the acoustic wavelength) which is required to bring about the reinforcement necessary for diffraction.

The invention arises from the finding of the suitability of the described materials for use in a broad class of otherwise known acousto-optic devices. Since claims are broadly in terms of such devices, some descriptive matter is directed to their general design. Nevertheless, the invention encompasses all acousto-optic uses of the listed materials. Broadly, all such devices depend for their operation on the interaction of electromagnetic energy as defined and elastic wave energy as defined.

To distinguish the inventive devices from others using the same materials, it is specified that means be included for propagating elastic wave energy through the material. This means may constitute an elastic wave transmission line or a transducer (operating piezoelectrically, electrostrictively, or magnetostrictively). Where provision is made for means for transmitting electromagnetic wave energy this term too should be construed broadly. Such means may include an oscillator such as a laser or a thermally excited source (since diffraction devices do not require that the radiation be either coherent or polarized) or may simply consist of one or more optically polished surfaces with or without coatings.

Historically, acousto-optic interactions have come to be considered as representative of one or the other of two limiting classes. The first of these is sometime denoted Raman-Nath and sometimes Debye-Sears. The second class is called Bragg scattering.

These two limiting mechanisms are distinguished by the value of the fraction $$g = L \cdot \lambda_l / \lambda_s^2 \qquad \text{eq. (1)}$$

where

L is the length of the waist of the elastic wave orthogonal to its propagation direction in the plane determined by the propagation directions of the elastic and optical waves (waist is the acoustic equivalent of the optical focal point). This waist may be either real or virtual. For example, the waist of an elastic wave emitted from a flat transducer occurs at the transducer and is equal to the transducer length; while for a curved transducer the elastic wave is focused to a waist at some distance away from the transducer.

$\lambda_l$ is the wavelength of electromagnetic radiation within the acousto-optic medium, and $\lambda_s$ is the wavelength of the elastic wave also within the acousto-optic medium.

Bragg diffraction occurs when the numerical value of $g$ in eq. (1) is equal to or greater than one. In this limit, up to 100 percent of the incident electromagnetic radiation may be deflected to a single diffraction order, i.e., direction. The orientation of the elastic and electromagnetic waves in a Bragg device must be restricted to satisfy the Bragg conditions as shown in *IEEE Journal of Quantum Electronics*, Vol. QE-3, p. 85 (1967). The Raman-Nath limit occurs when the value of $g$ in eq. (1) is much less than one. In this case electromagnetic radiation is generally diffracted into many different orders. Although 100 percent of the incident electromagnetic energy may be deflected by a Raman-Nath device, the maximum energy directed into any given order is only 34 percent. The orientation of the elastic and electromagnetic waves in a Raman-Nath device is not critical to their performance as it is for a Bragg device.

While Bragg diffraction devices are generally preferred, if only by reason of their greater deflection efficiency to a single order, the invention encompasses either mechanism or, indeed, any intermediate case where $g$ give by eq. (1) is less than one but not small enough to be within the range applicable for the Raman-Nath limit.

DETAILED DESCRIPTION

1. Drawing

Figure 1:
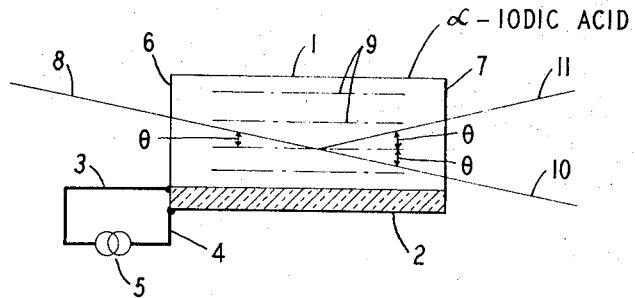
FIG. 1 is a diagrammatic view, partly in section, of a Bragg deflector utilizing $PbMoO_4$ as the operative element.

The device in FIG. 1 is a Bragg deflector consisting of acousto-optic element 1 made of a material herein and elastic wave source 2. Source 2 may be a piezoelectric transducer made, for example, of lithium niobate and, in this illustration, is shown equipped with electrodes 3 and 4 connected with AC or modulating source 5. In this illustration, body 1 is proved with optically polished surfaces 6 and 7. These surfaces may also be equipped with transparent coatings to protect them and/or to minimize reflection losses. In operation, a beam 8 of electromagnetic wave energy (which may be focused or defocused by a lens system not shown) of a wavelength within the transparency bandwidth of the element 1 is introduced (after being refracted at the surface) at some angle, theta, to the advancing elastic wave fronts diagrammatically denoted 9.

While some of beam 8 continues through body 1 and exits as beam 10 in a direction identical to that of beam 8, a discrete portion is deflected by interaction with the elastic wave into an angle, two theta, and emerges as beam 11.

The diagrammatic view of FIG. 1 illustrates the most efficient mode of operation of a Bragg deflector in accordance with which the incident and defracted beams are at the same angle, known as the Bragg angle, to the advancing elastic wave front. Bragg deflectors are, however, operative over a limited range of angles centered about this optimum orientation. The Bragg defraction condition requires constructive interference of scattered light waves. This condition is satisfied when the path distance traversed by a light wave defracted by one elastic wave front is one light wavelength greater than the path length of a light wave defracted from an adjacent wave front. For some operating conditions in which the elastic wavelength is appreciably larger than the light wavelength, the diffraction angle, two theta, may be approximated as equal to the ratio of the light wavelength to the elastic wavelength. Since the elastic wavelength is, in turn, the ratio of the elastic velocity to the elastic frequency and since the velocity is constant within a given medium for a given direction of acoustic wave propagation, the diffraction angle for a given light wavelength to a first approximation is directly proportional to the elastic wave frequency. Variation in this frequency, therefore, permits selection of any of a variety of deflection angles. Advantage is taken of this relationship in a multiposition $x$, $y$ deflector system, such as that shown in FIG. 2.

The device shown in FIG. 1 may also be operated as a general information processing device which uses an optical link. For example, when the frequency of the source 5 is made to follow the (swept) frequency of a chirped radar signal the device can be made to provide pulse compression for the received signal, thereby improving its signal to noise ratio. Similarly, by placing other information onto the elastic wave by suitably varying the frequency and/or amplitude of source 5, the device can be made to perform the information processing functions of correlation, filtering, spectrum analysis, etc.

The devices of the invention are in essence changeable phase diffraction gratings, and the diffraction efficiency is related to the variation in refractive index produced by the elastic wave. Since this variation is, in turn, dependent upon the amplitude of the elastic wave, the magnitude of the diffracted beam energy is so determined. The figure of merit for such a grating may be determined from:

$$M_2 = (n^6 p^2)/(\rho v^3) \qquad \text{eq.(2)}$$

where $M_2$ is the figure of merit for a specified combination of elastic and electromagnetic wave directions and polarizations relative to the crystal structure of the acousto-optic medium, $n$ is the reflective index, $p$ is the photoelastic component, $\rho$ is the density of the acousto-optic medium, and $v$ is the elastic wave velocity in the acousto-optic medium.

The values of $n$, $p$ and $v$ depend on the crystallographic orientation. For example, 10 independent photoelastic components are permitted by the symmetry of $PbMoO_4$. Useful values of the figure of merit have been found for longitudinal and shear elastic waves in combination with optical waves polarized along each of the three major crystallographic directions. Many of the corresponding figures of merit have now been determined for different optical wavelengths, and the best of these values have been found to be approximately five times superior to the best value for lithium niobate.

The above efficiency, which is characteristic for the material of the invention, occurs in $PbMoO_4$ for a $c$-cut crystal, that is, with the elastic wave propagating along the $c$ [001] axis and the light beam propagating near to the $a$ [100] axis (so as to satisfy the Bragg condition). This geometry not only results in the highest measured figure of merit but has the unusual property that the magnitude of the acousto-optic interaction is independent of the optical polarization state. This property is particularly useful for devices which operate with unpolarized light and may have a considerable advantage in x–y light deflection systems. This useful property of the c-axis cut cannot be predicted from symmetry arguments or from the present theory of the photoelastic effect. While it may be simply an accident of nature, it is also observed in at least one other compound of the included class; $PbWO_4$.

The electrical power necessary to deflect 50 percent of the incident light beam for a typical configuration having a longitudinal elastic wave travelling in the crystallographic c direction and an electromagnetic beam travelling in the a direction was experimentally found to be about 0.7 watt at an elastic wave midband frequency of 140 MHz. The 3 db. bandwidth was 80 MHz, and the optical wavelength was 5,145 A.

Figure 2:
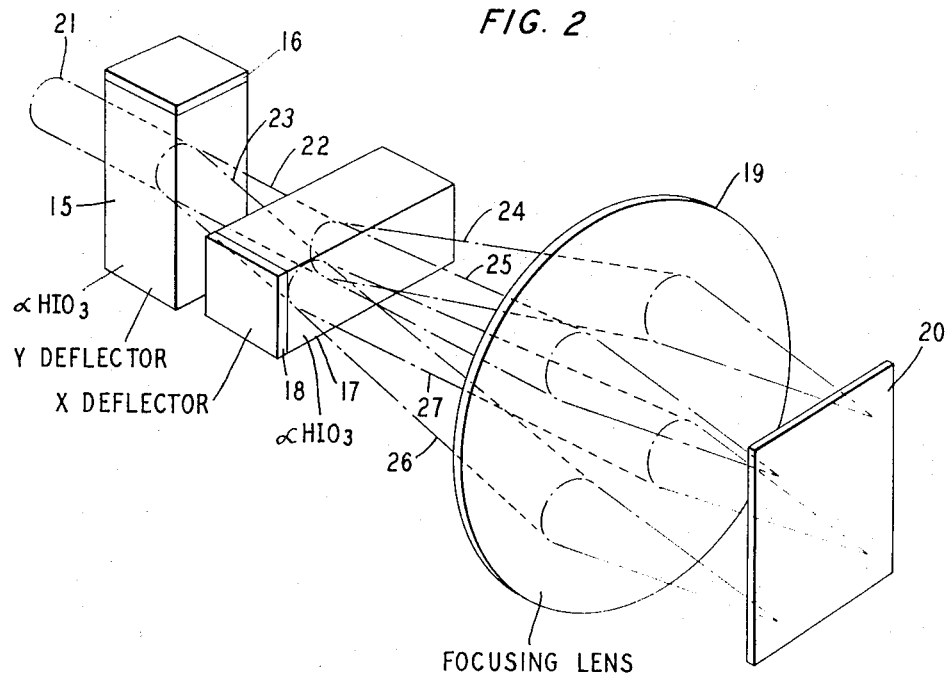
FIG. 2 is a perspective diagrammatic view of a deflection system using separate $x$ and $y$ Bragg deflectors.

The deflector system of FIG. 2 consists of elasto-optic element 15 proved with elastic wave generator 16, elasto-optic element 17 equipped with elastic wave generator element 18, focusing lens 19 and display screen and/or information storage plane 20. In operation, electromagnetic radiation of appropriate wavelength is introduced as beam 21 from a source not shown. On passing through element 15, a portion of this beam is deflected vertically to any position between the two limiting beam directions 22 and 23 by an amount determined by the elastic wave produce by generator 16 energized by means not shown. The vertically deflected beam is similarly deflected in the x, or horizontal, direction upon passing through element 17 by reason of interaction with elastic wave fronts produced by generator 18 and again energized by means not shown. The result is that the light beam which is now both vertically and horizontally deflected emerges from element 17 in any of the limiting positions shown as beams 24, 25, 26 and 27 or in any intermediate direction dependent upon the frequencies at which generators 16 and 18 are energized. The deflected beam, upon passage through focusing lens 19, is resolved to a spot on the focal plane element 20. The system may be used for display purposes by sequentially deflecting a varying fraction of the incident light beam 21 to each resolvable spot position on the display screen element 20. When the system is used in information processing, each resolvable position on the display screen will be a site of information storage. The information may be stored photographically, holographically, or by some other convenient means. When it is desired to detect or "readout" information stored at any particular position on element 20, generator 16 and 18 are energized at the appropriate frequencies to deflect the light to that position. The stored information is then projected onto an array of light-sensitive detectors not shown.

Figure 3:
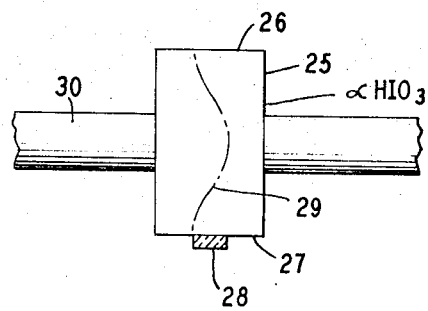
FIG. 3 is a diagrammatic view of a resonant acousto-optic device operating as a laser mode-locking structure.

FIG. 3 depicts an acousto-optic element arrangement for mode locking a laser. The acousto-optic element 25 in this instance is equipped with reflecting ends 26 and 27. The elastic wave transducer 28 energized at the appropriate frequency by means now shown results in a standing elastic wave 29. Broken section 30 represents a portion of a laser cavity. Mode locking results when the acousto-optic element 25 is so designed and operated as to produce a periodic diffraction of the same periodicity (or multiples thereof) as the resonant frequency which separates longitudinal or transverse modes of the laser. In general, mode locking by the arrangement shown is accomplished by operation in the Raman-Nath limit and to this end, transducer 28 is depicted as having a relatively short dimension in the direction of optical propagation. Alternatively, designs may be such as to utilize Bragg diffraction in which event the arrangement is desirably such that the light transmission direction is at the usual Bragg angle to the elastic wave front.

Figure 4:
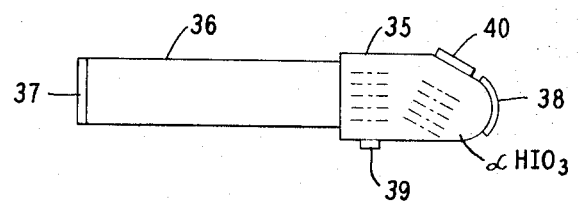
FIG. 4 is a diagrammatic view of a laser cavity containing an acousto-optic element serving the dual functions of mode-locking and sampling.

The arrangement shown in FIG. 4 consists of a body 35 of $PbMoO_4$ or related material and a laser 36 such as YAG-neodymium. The laser cavity is defined by reflecting layers 37 and 38. Body 35 is provided with a Raman-Nath elastic wave transducer 39 for mode locking and also with a Bragg elastic wave transducer 40 for deflecting and thereby sampling laser emanations.

Figure 5:
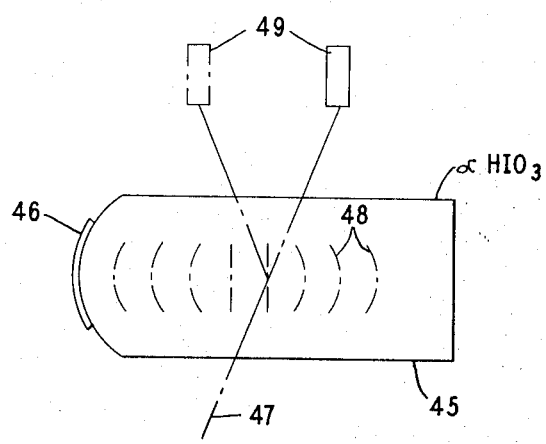
FIG. 5 is a diagrammatic view of a focused elastic wave beam, acousto-optic deflector.

The device of FIG. 5 is a focused elastic wave Bragg deflector usefully operated as a modulator. It consists of acousto-optic element 45, curved elastic wave transducer 46, and means for transmitting a light beam such as 47. The curved transducer focuses elastic waves to a waist at the approximate center of body 45 as diagrammatically depicted by the elastic wave fronts 48. Beam 47 is deflected at a discrete angle in accordance with the usual Bragg mechanism. Amplitude modulation is accomplished by placing a detector 49, as shown, so as to measure the intensity of the portion of beam 47 which is undiffracted. It has been seen that the intensity as measured by 49 is dependent on both elastic wave amplitude and elastic wave frequency. Alternatively, detector 49 may be place in the phantom position indicated so as to measure the intensity of the portion of beam 47 which is diffracted.

The purpose of a focused elastic wave device is to decrease the required amount of elastic wave energy. It has been demonstrated that the modulation bandwidth is proportional to the angular range of the elastic wave beam and further that optimum modulation is achieved for an elastic wave angle range equal to the diffraction angle of the light. Suitable modulator design involves a tradeoff of one consideration for the other. It has also been shown by E. I. Gordon, Vol. 54, *Proceedings of the IEEE*, p. 1391 (Oct. 1966) that the advantage of focusing is retained even where the interaction takes place in a volume not including the focal plane, i.e. waist, and even for the extreme case where the focal plane, real or virtual, is not in the acousto-optic medium. The advantage of bringing about the interaction close to the elastic wave transducer rather than at the focal plane is the minimization of delay time corresponding to the transit time for elastic wave fronts to reach the light beam position from the elastic wave transducer.

The device depicted in FIG. 5 may also, with suitable modulation of the input ultrasonic wave, be made to perform some of the general information processing functions, such as correlation and chirped radar pulse compression, described previously in the discussion of FIG. 1.

Figure 6:
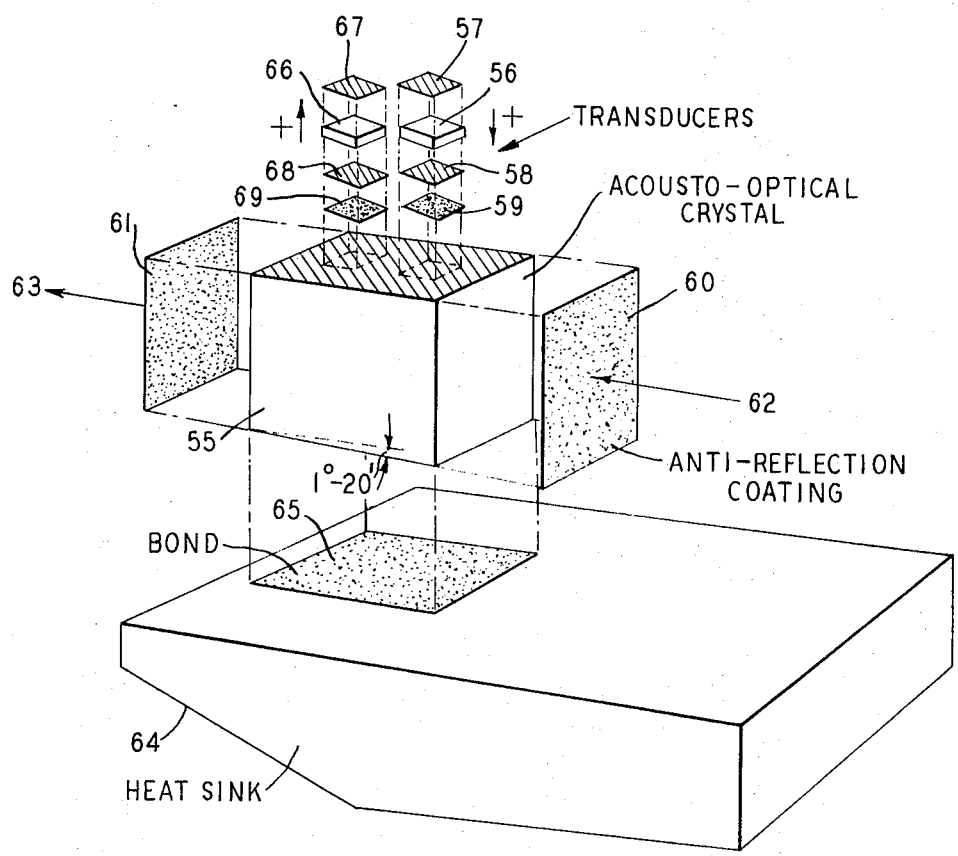
FIG. 6 is an exploded view showing in detail the design of a light deflector utilized in some of the experimental work reported herein and which is suitable for incorporation in the $x$–$y$ deflection system shown in FIG. 2.

FIG. 6 depicts a single-stage light deflector. Such stage consists of a c-cut $PbMoO_4$ crystal 55 in which an elastic wave field is produced by electrically driving the longitudinal mode, series-connected, oppositely poled lithium niobate transducers 56 and 66. Elements 56 and 66 are provided with chrome-gold electrodes 57, 67 and 58, 68 connected to electrical source not shown. Bonding of elements 56 and 66 to crystal 55 is accomplished by cold welding through indium layers 59 and 69. Crystal element 55 is provided with thorium fluoride antireflection coatings 60 and 61, and these define the propagation direction for a light beam as, for example, a 5,145 A wavelength beam from an argon ion laser. The direction of this beam is indicated by arrows 62 and 63. For the arrangement shown, deflection is vertical, the degree of deflection being directly proportional to the frequency at which transducers 56 and 66 are electrically excited.

Use of two transducers, 56 and 66, rather than a single transducer of equivalent area results in a fourfold increase in the effective electrical impedance of the transducer in the actual experiment conducted. This resulted in the practical advantage of permitting direct drive from a 50 ohm impedance source.

An advantage of the experimental arrangement shown in FIG. 6 is the close match between the mechanical impedances of lithium niobate (the transducer material of 56 and 66) and $PbMoO_4$. This match together with the inherently large electromechanical coupling coefficient of lithium niobate permits efficient broadband operation. In actual operation, each deflector stage operated efficiently over a bandwidth of 80 MHz, (centered at approximately 130 MHz.). This bandwidth was limited only by the power amplifiers that were available for the experiment. With an acoustic drive power of about 1-watt deflection of greater than 50 percent of the incident light beam was produced.

Crystal 55 is bonded to aluminum heat sink 64 through epoxy bond 65. The mechanical impedance of aluminum is sufficiently close to that of PbmMoO$_4$ so that most of the outgoing ultrasonic signal produced by transducers 56 and 66 after causing light deflection in crystal 55, is directly transmitted into heat sink 64 where it is dissipated. Under the experimental conditions, about 4 percent of the ultrasonic signal was reflected from the aluminum-PbmMoO$_4$ interface back into the region of the light beam. This reflected signal was rendered harmless by inclining the interface at a small angle (1° 20′) so that the reflected wave did not satisfy the Bragg condition with respect to the light beam.

2. Material Considerations

Exemplary members of suitable material classes of the invention have been outlined. The compounds, PbMoO$_4$, PbWO$_4$ and mixtures thereof, and Pb$_2$MoO$_5$, Pb$_2$WO$_5$ and mixtures thereof constitute a preferred class. Within this class, PbMoO$_4$ is perhaps the most valuable not only because deflection angle is independent of polarization (this characteristic appears in at least one other member—PbWO$_4$) but also because it is readily grown in large size crystal sections of high optical quality. Materials of the inventive class are in general quite easily grown and it may be that with further development PbMoO$_4$ will not be preferred for this reason alone. A further advantage is associated with the observation that this compound preferentially grows from the melt at an angle at about 30° off c-axis (high optical quality has previously been associated with crystals grown in directions not corresponding with the major crystallographic axis).

The general class of materials, in accordance with the invention, all rely upon a cation of lead or thallium, both of which are characterized by high ionic polarizability attributed to an unshared pair of electrons in the outer (6s) shell. On one scale, these polarizabilities are about 20 and 30 for lead and thallium, respectively. Bismuth, which on the same scale has a polarizability of about 10, is, for this reason, not considered preferred. Still discussing the chemical nature of the included compounds, anionic groups are oxidic. The general class is made up of the stable compounds which are substantially water insoluble and which have the following general characteristics:

1. Unshared pair of electrons in the 6s shell,
2. Relatively soft (less that 3.5 on the Moh's hardness scale),
3. Relatively dense (density in excess of 5g./cm.$^3$), and
4. Cations of thallium or lead as discussed. While growth appears to be less complicated for the simpler compounds (those containing only one cation per formula unit) and increase in the cation to oxygen ration increases the net polarizability density and, therefore, increases the deflection efficiency in accordance with the figure of merit discussed. The general class includes such higher order compounds, that is, those having two or more cations per formula unit, where such compounds are stable and otherwise meet the requisite set forth. The general class may be represented by the following formulas: Tl$_2$O·M$^{VII}_2$O$_7$; Tl$_2$O·M$^{VI}$O$_3$; (Tl$_2$O)$_x$·M$^V$O$_5$; (Tl$_2$O)$_x$·M$^{IV}$O$_2$; (Tl$_2$O)$_x$·M$^{III}_2$O$_3$; (PbO)$_y$·M$^{VI}$O$_3$; (PbO)$_x$·M$^V_2$O$_5$; (PbO)$_x$·M$^{IV}$O$_2$; (PbO)$_2$·M$^{III}_2$O$_3$.

Where

M$^{VII}$ equals Re;
M$^{VI}$ equals W, Mo, S, Se, Te;
M$^V$ equals P, As, Sb, V, Nb, Ta;
M$^{IV}$ equals Si, Ge, S;
M$^{III}$ equals B, Bi, In; p1 x equals 1, 2, 3;
y equals 1 and 2; and
z equals 1 through 8.

Mixed crystals including two or more of any of the members are contemplated.

Included compositions are generally grown by pulling from a melt by the technique which is sometimes denoted Czochralski growth. Melts are easily prepared simply by mixing the stoichiometric amounts of the oxides or other compounds which will yield the compounds upon heating. PbMoO$_4$, for example, is produced by melting together equal molar amounts of PbO and MoO$_3$. Excellent optical grade crystals have resulted by heating a melt by rf induction in a platinum crucible and pulling at a rate of about one-fourth inch an hour while rotating at about 140 r.p.m. The melting point of PbMoO$_4$ is 1,060° C. Strain introduced during growth was annealed out in air at 800° C. over a period of from 1 to 24 hours.

The following table indicates some of the significant parameters of illustrative materials in accordance with the invention. For the convenience of the design engineer, comparison is made both with the usual standard, fused silica, and also with the materials αHIO$_3$ and LiNbO$_3$. The materials of the invention show a substantial increase in deflection efficiency for decreasing wavelength; and in the instance of PbMoO$_4$, parameter values are given for the two wavelengths resulting from a helium neon 6,328 A laser (denoted red) and from an argon 4,880 A laser (denoted blue). Acoustic loss figures are measured at 500 MHz. The loss figure increases approximately as the second power of the frequency. Two figures of merit are presented; the first has been discussed in detail, the second is of value for x–y light deflection systems such as shown in FIG. 2 where certain geometrical constraints relate to material parameters.

TABLE

| Material | $M_2 = \dfrac{n^6 p^2}{\rho V^2}$ | $M_3 = \dfrac{n^7 p^2}{\rho V^2}$ | Acoustic loss, db/μsec. |
| --- | --- | --- | --- |
| Fused silica | 1 | 1 | 1.8 |
| PbMoO$_4$ | Red 20—Blue 37 | Red 21—Blue 39 | 1.0 |
| PbWO$_4$ | Red 18.2 | Red 16 | 5.0 |
| Pb$_2$MoO$_5$ | Red 27 | Red 22 | 5.0 |
| HIO$_3$ | Red 55 | Red 32 | 1.0 |
| LiNbO$_3$ | Red 4.6 | Red 7.5 | 0.005 |

NOTE.—Red = helium neon (6328 A.); Blue = argon (4880 A.).

What is claimed is:

1. Acousto-optic comprising at least one acousto-optic element provided with first means for generating elastic waves and second means for transmitting electromagnetic radiation, the said first and second means being such as to result in diffraction of at least a portion of said electromagnetic radiation, characterized that the said element is a crystalline body consisting essentially of at least one composition selected from the group of compounds which may be represented by the formulas Tl$_2$O·M$^{VII}_2$O$_7$, Tl$_2$O·M$^{VI}$O$_3$, (Tl$_2$O)$_x$·M$^V$O$_5$, (Tl$_2$O)$_x$·M$^{IV}$O$_2$, (Tl$_2$O)$_x$·M$^{III}_2$O$_3$, (PbO)$_y$·M$^{VI}$O$_3$, (PbO)$_2$·M$^V_2$O$_5$, (PbO)$_x$·M$^{IV}$O$_2$, (PbO)$_2$·M$^{III}_2$O$_3$ where M$^{VII}$ equals Re; M$^{VI}$ equals W, Mo, S, Se, Te; M$^V$ equals P, As, Sb, V, Nb, Ta; M$^{IV}$ equals Si, Ge, S; M$^{III}$ equals B and Bi; x equals 1, 2, 3; y equals 1 and 2; and z equals 1 through 8; and mixtures thereof.

2. Device of claim 1 in which the said crystalline body consists essentially of a composition selected from the group consisting of PbMoO$_4$, PbWO$_4$, mixtures thereof, and Pb$_2$MoO$_5$, Pb$_2$WO$_5$ and mixtures thereof.

3. Device of claim 2 in which said electromagnetic radiation is essentially monochromatic and of a wavelength in vacuum within the approximate range of from 3,900 A to 56,000 A.

4. Device of claim 3 in which said electromagnetic radiation is substantially coherent.

5. Device of claim 3 in which said first means is capable of generating elastic waves of different wavelengths.

6. Device of claim 2 in which the operational conditions are such that the waist of the generated elastic wave front multiplied by the wavelength of electromagnetic radiation divided by the wavelength of the elastic wave squared is numerically at least equal to one.

7. Device of claim 6 in which the said first means is of such design as to produce focused elastic waves.

8. Device of claim 6 in which the said second means includes a laser cavity and in which the deflected portion of the beam is thereby removed from the said cavity.

9. Device of claim 2 in which the operational conditions are such that the waist of the generated elastic wave front multiplied by the wavelength of electromagnetic radiation divided by the wavelength of the elastic wave squared is numerically less than one.

10. Device of claim 9 in which the said element is so arranged as to constitute a resonant cavity for said elastic waves.

11. Device of claim 10 in which said second means comprises a laser cavity and in which the said first means is of such nature as to generate elastic waves of a frequency equal to a multiple of the resonant mode frequency spacing of the said laser cavity.